United States Patent [19]

Niskanen

[11] Patent Number: 4,726,251
[45] Date of Patent: Feb. 23, 1988

[54] REMOTE CONTROL ASSEMBLY WITH IMPROVED ISOLATOR

[75] Inventor: Don L. Niskanen, Livonia, Mich.

[73] Assignee: Teleflex Incorporated, Limerick, Pa.

[21] Appl. No.: 885,534

[22] Filed: Jul. 14, 1986

[51] Int. Cl.$^4$ .................................................. F16C 1/10
[52] U.S. Cl. ................................... 74/502; 74/501 R; 74/501 P
[58] Field of Search ............ 74/501 R, 501 A, 501 C, 74/501 D, 501 E, 501 F, 501 P, 502, 503

[56] References Cited

U.S. PATENT DOCUMENTS

| | | | |
|---|---|---|---|
| 2,373,776 | 4/1945 | Parr | 74/501 F |
| 2,496,931 | 2/1950 | Brouse | 74/502 |
| 2,858,708 | 11/1958 | Brickman | 74/502 |
| 3,101,205 | 8/1963 | Benham | 74/501.5 R |
| 3,144,919 | 8/1964 | Foote et al. | 74/502 |
| 3,513,719 | 5/1970 | Tschanz | 74/501 R |
| 3,994,185 | 11/1976 | Gilardi | 74/502 |
| 4,088,156 | 5/1978 | Kubo et al. | 74/502 |
| 4,093,241 | 6/1978 | Muntjanoff et al. | 74/502 |
| 4,308,178 | 4/1983 | Bennett et al. | 74/502 |
| 4,406,177 | 9/1983 | Bennett et al. | 74/501 P |
| 4,537,090 | 8/1985 | Jones | 74/502 |

FOREIGN PATENT DOCUMENTS 1373018  11/1974  United Kingdom .................. 74/502

*Primary Examiner*—Gary L. Smith
*Assistant Examiner*—Vinh Luong
*Attorney, Agent, or Firm*—Reising, Ethington, Barnard, Perry & Milton

[57] ABSTRACT

A motion transmitting remote control assembly of the type for transmitting motion in a curved path by a flexible core element (12) in a conduit (18) and a method of making same. An end fitting (20) is disposed about the conduit (18) by a cylindrical section which includes abutments (24). A vibration dampener (16) includes a cylindrical tube disposed about the end fitting (20) with grooves (28) aligned with the abutments (24) and tabs (30) extending radially outward from the vibration dampener (16). A support (14) includes a cylindrical wall (32) disposed about and coextensive with the vibration dampener (16) with openings (34) aligned with the tabs (30) of the vibration dampener (16). The vibration dampening means (16) is in axial mechanical interlocking engagement with the end fitting (20) and support (14) for maintaining the vibration dampener (16) free of radial compressive forces.

18 Claims, 4 Drawing Figures

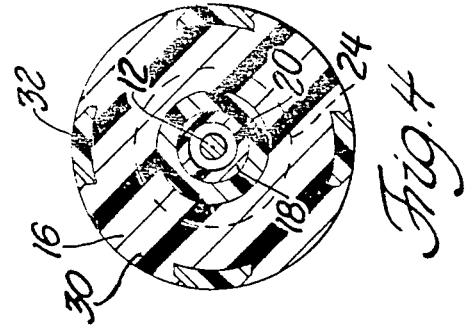
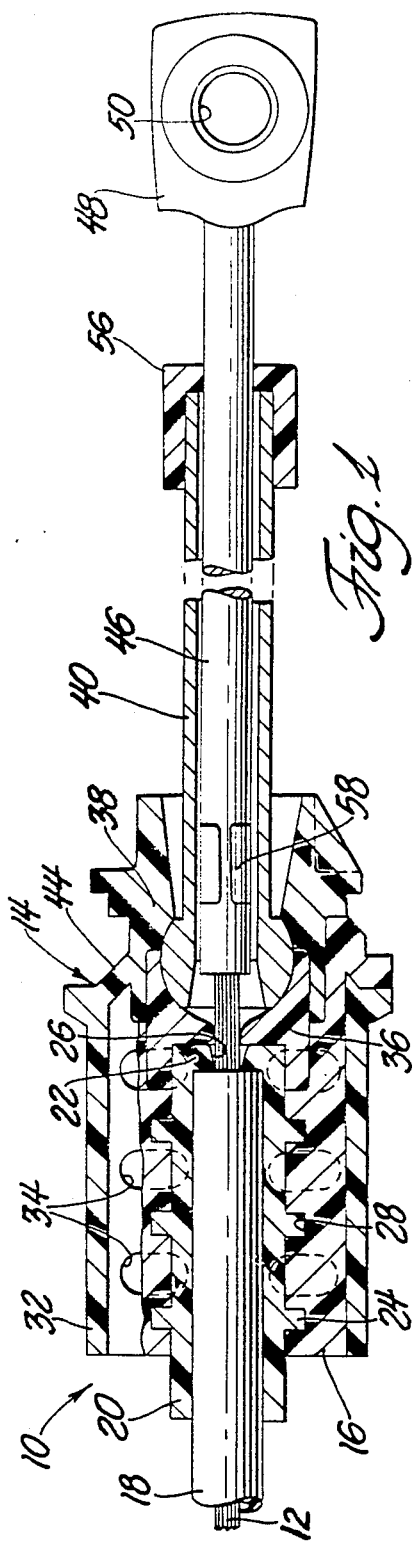
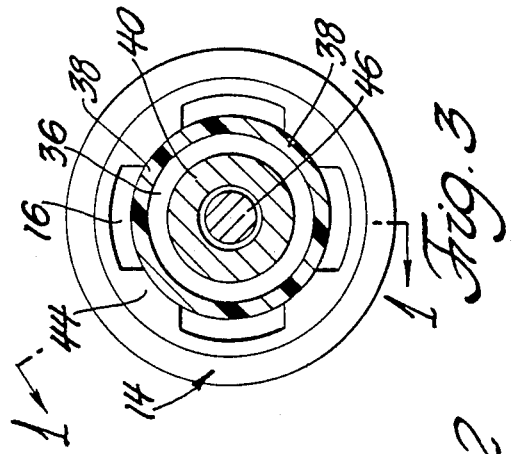
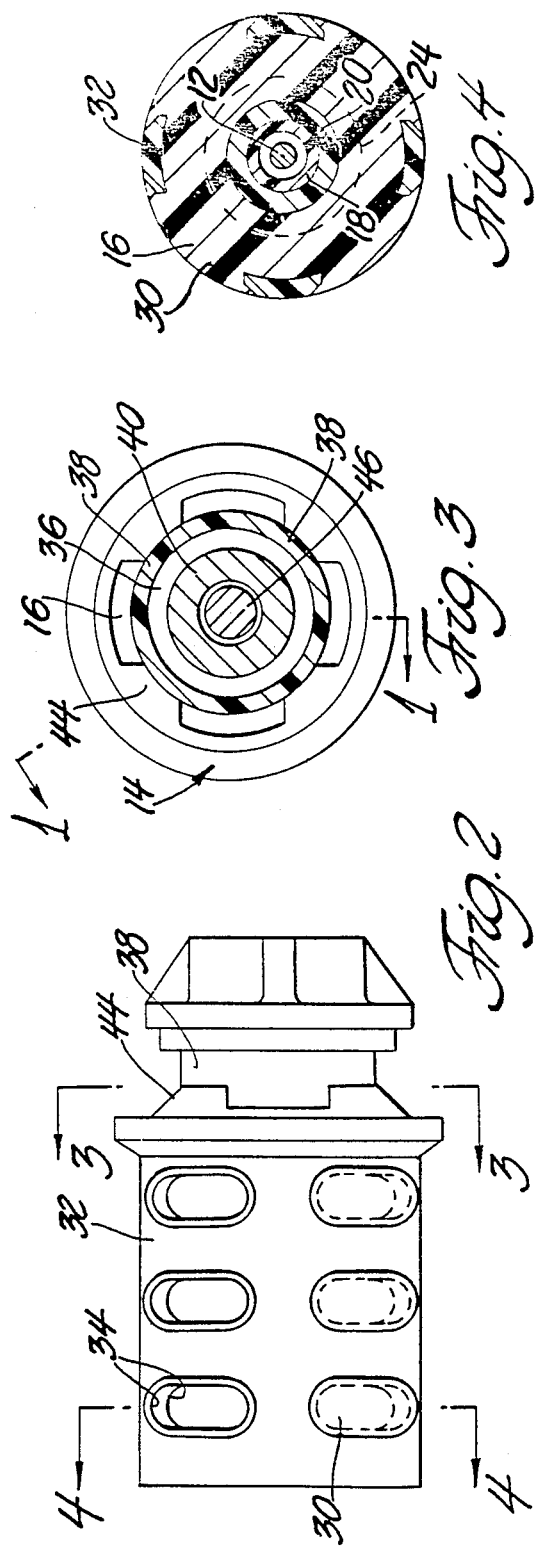

REMOTE CONTROL ASSEMBLY WITH IMPROVED ISOLATOR

TECHNICAL FIELD

This invention relates to a motion transmitting remote control assembly of the type for transmitting motion in a curved path by a flexible motion transmitting core element slideably disposed within a guide such as a conduit. More specifically, the invention relates to such a remote control assembly including a support housing for supporting the flexible conduit transmitting core element through an aperture in a bulk head or other support structure.

BACKGROUND ART

Push-pull assemblies have included a support housing disposed within a bulk head or partition for supporting a push-pull cable passing therethrough. The assembly comprises of a conduit having an end fitting such that the end fitting is disposed within the support housing. A problem arises when vibrations, originating in the support housing, are passed to the cable through the end fitting or vice versa.

There are assemblies known in the prior art where dampening vibration means are used to isolate vibrations which normally pass from the bulkhead through the end fitting to the push-pull cable such that the movement of the cable is not attenuated while the vibrations are effectively dampening, or vice versa. One type of such assembly includes an end fitting disposed around the end of the conduit within a support housing to support the end fitting and a portion of the conduit on a support structure. A resilient vibration dampener is disposed between the support housing and the end fitting for providing noise and vibration isolation therebetween. The support housing is completely isolated from the conduit and extends along and has flanges about the end of the vibration dampening means. The vibration dampening means in held in place by compressive forces created by the support housing. U.S. Pat. No. 4,406,177 granted Sept. 27, 1983 in the name of William G. Bennett and assigned the assignee of the subject invention, discloses such a system where the support housing is isolated from the conduit and the end fitting by a compressed isolation dampener.

SUMMARY OF THE INVENTION

The invention relates to a motion transmitting remote control assembly of the type for transmitting motion in a curved path by a flexible motion transmitting core element. The assembly consists of a flexible motion transmitting core element and a guide means for movably supporting the core element. The core element extends from the end of the guide means. A support means is included for supporting the guide means on a support structure. A resilient vibration dampening means is disposed between the support means and the guide means for providing noise and vibration isolation therebetween. The assembly is characterized by mechanical interlocking means for preventing disassembly of the vibration dampening means from the support means and the guide means axially thereof and for maintaining the vibration dampening means free of radial compressive forces.

Also included is a method for making such an assembly including the steps of forming inside abutments extending radially from the exterior of the guide means, forming the support means with outside abutments extending radially, and forming resilient vibration dampening means in axial mechanical interlocking engagement with the abutments and free of radial compressive forces between the support means and the guide means.

The present invention improves the prior art by keeping the vibration dampening means free of radial compressive forces thus allowing greater vibration isolation.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a cross-sectional view taken substantially along line 1—1 of FIG. 3;

FIG. 2 is a side view of a preferred embodiment of the subject invention;

FIG. 3 is a cross-sectional view taken substantially along line 3—3 of FIG. 2; and FIG. 4 is a cross-sectional view taken substantially along line 4—4 of FIG. 2.

DESCRIPTION OF PREFERRED EMBODIMENTS

A motion transmitting remote control assembly of the type for transmitting motion in a curved path by a flexible motion transmitting core element is shown at 10 in FIG. 1. The assembly 10 includes a flexible motion transmitting core element 12 and a guide means for movably supporting the core element 12. The assembly includes a support means generally indicated at 14 for supporting the guide means on a support structure such as the bulkhead or other partition whereby the core element 12 passes through an aperture in the bulkhead.

The subject invention is characterized by a resilient vibration dampening means 16 disposed between the support means 14 and the guide means for providing noise and vibration isolation therebetween. The vibration dampening means 16 is shown in FIGS. 1 and 2 as partially cut away from the support means 14 for illustration only, i.e. the vibration dampening means 16 is not shown in the upper half of FIGS. 1 and 2. The vibrations originating in the support structure or bulkhead are absorbed by the vibration dampening means 16 such that the vibrations are not transmitted to the core element 12 or conduit 18. In a similar fashion, such vibrations are not transmitted in the opposite direction from the core element 12 or a conduit 18 to the bulkhead or other support structure.

The guide means includes a flexible conduit 18 and an end fitting 20 extended about an end portion of the conduit 18. The conduit 18 extends from a first end 22 of the end fitting 20. The core element 12 extends beyond the first end 22 of the end fitting 20. The end fitting 20 includes a cylindrical section disposed about the conduit 18. The cylindrical section 20 is of a uniform diameter with abutments 24 extending radially outward to a second diameter. The abutments 24 are multiple rings extending radially from the end fitting 20 to the second diameter. The rings 24 are equally spaced along the end fitting 20. The cylindrical section of the end fitting 20 includes the first end 22 extending over the end face of the conduit 18 and has a hole 26 therethrough with the core element 12 extending through the hole 26.

The vibration dampening means 16 includes a cylindrical tube which extends around the first end 22 of and along the end fitting 20. The inner surface of the cylindrical tube 16 has grooves 28 therein and the grooves 28 are aligned with and in interlocking engagement with the rings 24 of the end fitting 20. The cylindrical tube of the vibration dampening means 16 has an outer surface which includes retentive tabs 30 extending radially outward from the outer surface thereof. There are three rows of four retentive tabs 30, for a total of twelve tabs 30, which are equally spaced circumferentially along the cylindrical tube 16 and oval in shape. The vibration dampening means 16 is disposed longitudinally along the end fitting 20. The end fitting 20 extends along the conduit 18 further than the vibration dampening means 16 extends along the end fitting 20 to completely isolate the support means 14 from the end fitting 20.

The support means 14 extends longitudinally along the vibration dampening means 16 and is completely isolated from the end fitting 20 by the vibration dampening means 16. The support means 14 includes a cylindrical wall 32 extended about the cylindrical tube of the vibration dampening means 16. The cylindrical wall 32 includes openings 34 extending radially outward through the support means 14. The openings are shown by the partially cut away vibration dampening means 16 in the upper portion of the assembly in FIG. 1 and FIG. 2, and in phantom in the lower portions of FIG. 1 and FIG. 2 where the vibration dampening means 16 has filled the openings 34 with the tabs 30. FIGS. 3 and 4 show the cross-section of the assemby including the total vibration dampening means 16.

The openings 34 of the cylindrical wall 32 are defined by an oval wall which receives each of the tabs 30 in each of the oval openings 34. The tabs 30 and the contiguous openings 24 are circumferentially spaced and in longitudinally spaced rows along the vibration dampening means 16. The openings 34 and tabs 30 are aligned for axial mechanical interlocking engagement of the vibration dampening means 16 within the support means 14 to prevent disassembly of the vibration dampening means 16 from the support means 14 and for maintaining the vibration dampening means 16 free of radial compressive forces. In other words, the mechanical interlocking engagement prevents relative longitudinal or axial movement between the fitting 20 and the support means 14 while being free of radial forces capable of transmitting forces.

A swivel socket section is generally indicated at 38 and is suspended in radially spaced relationship within the cylindrical wall 32 of the support means 14. The vibration dampening means 16 is exposed at both ends of the cylindrical wall 32. A spacer 36 is disposed about the first end 22 of the end fitting 20 and the core element 12 and adjacent the swivel socket section 38. The spacer 36 of the vibration dampening means 16 is retained in the swivel means 38 for encapsulating the spherical end of a swivel tube 40 therein and to act as part of the vibration dampening function. The spacer 36 is preferably of the same material as the subsequently molded material 16. The swivel socket section 38 allows a swiveling motion of the swivel tube 40 and movably supports the core element 12. The swivel socket section 38 is attached to the support means 14 by integral spokes 44 which suspend the swivel socket section 38 within the cylindrical wall 32 of the support means 14. The swivel tube 40 extends away from the first end 22 of the end fitting 20 and out of the swivel socket 38. The swivel tube 40 has a spherical end slidingly retained between the swivel socket section 38 and the spacer 36.

The core element 12 includes a slider rod 46 which is slideably supported in and extends from the swivel tube 40. The slider rod 46 includes an end portion 48 having an opening 50 therethrough adapted for being pivotally secured to an actuating lever member.

As shown in FIG. 1, the swivel socket section 38 includes a wiper cap 56 attached to the distal end thereof. The wiper cap 56 is in sliding engagement with the slider rod 46. The wiper cap 56 has a lip abutting the distal end of the swivel tube 40 for preventing foreign substances from entering the end of the swivel tube 40 which would inhibit the movement of the slider rod 46 within the swivel socket section 38.

The end fitting 20, the support means 14, the vibration dampening means 16, and the spacer 36 are made of organic polymeric material. The vibration dampening means 16 and the spacer 36 are made of a softer material than the end fitting 20 and the support means 14. Thus, the vibration dampening means 16 and spacer 36 isolate the end fitting 20 and the portion of the conduit 18 disposed within the end fitting 20 from the support means 14 so as to effectively prevent the communication of vibrations therebetween without effecting the movement of the core element 12 within the assembly. The core element 12 is a flexible wire like element. The slider rod is attached to the core element at 58.

The support means 14 may be retained in an aperture of the support structure which surrounds the support means. As described in U.S. Pat. No. 4,406,177 assigned to the assignee of the invention the support means 14 may include an abutment portion for abutting the support structure at one extremity of the aperture therein to prevent the support means 14 from moving through the aperture. The support means 14 may also include a retaining means which includes a pair of flexible legs in a cantilevered fashion from the support means 14 and spaced from the abutment portion for moving through the aperture as the support means 14 is inserted therein and for engaging the support means 14 at the other extremity of the aperture for retaining the support means 14 therein. Another method of retaining the support means 14 in the support structure is by a retaining clip (not shown).

To make a motion transmitting remote control assembly of the type for supporting a flexible motion transmitting core element includes forming an end fitting 20 about the end of the conduit 18 with annular rings 24 defining the inside abutments. The support means 14 is formed as a cylindrical tube 32 with a swivel socket section 38 is suspended by spokes 44. A preformed spacer means 36 of a second vibration dampening material is inserted into the socket section 38 to engage the spherical end of the swivel tube 46. A swivel tube 46 is inserted with the spherical end seated within the swivel socket section 38. The vibration dampening means 16 is formed by injecting a first vibration dampening material into a cylindrical space between the end fitting 20 and the support means 14 in mechanical interlocking engagement with the inside and outside abutments. The outside abutments are formed as radially extending oval walled openings 30 in the cylindrical tube for mechanical interlocking engagement of the vibration dampening means 16 within the support means 14 to prevent disassembly of the vibration dampening means 16 from the support means 14 and for maintaining the vibration dampening means 16 free of radial compressive forces.

The invention has been described in an illustrated manner, and it is to be understood that the terminology which has been used is intended to be in the nature of words of description rather than limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A motion transmitting remote control assembly of the type for transmitting motion in a curved path by a flexible motion transmitting core element, said assembly comprising; a flexible motion transmitting core element (12), guide means for movably supporting said core element (12) and having an end, said core element (12) extending through the end of said guide means, support means (14) for supporting said guide means on a support structure, resilient vibration dampening means (16) disposed between said support means (14) and said guide means for providing noise and vibration isolation therebetween, mechanical interlocking means for preventing disassembly of said vibration dampening means (16) from said support means (14) and said guide means axially thereof and for maintaining said vibration dampening means (16) free of radial compressive forces, said mechanical interlocking means including retentive tabs (3) extending radially outwardly from said vibration dampening means (16) and openings (34) extending radially outwardly through said support means (14) and aligned with said tabs (30) on said vibration dampening means (16) for mechanical interlocking engagement with said vibration dampening means (16) within said support means (14) to prevent disassembly of said vibration dampening means (16) from said support means (14) and for maintaining said vibration dampening means (16) free of radial compressive forces.

2. An assembly as set forth in claim 1 wherein said guide means includes a conduit (18) having an end, and an end fitting (20) adjacent said end of said conduit (18), said conduit in tubular relationship around said core element (12).

3. An assembly as set forth in claim 2 wherein said support means (14) extends longitudinally along said vibration dampening means (16) and is completely isolated from said end fitting (20) by said vibration dampening means (16).

4. An assembly as set forth in claim 3 wherein said end fitting (20) includes a cylindrical section about said conduit (18) and of uniform diameter with abutments (24) extending radially outward to a second diameter, said vibration dampening means (16) being disposed about said abutments (24).

5. An assembly as set forth in claim 4 wherein said abutments (24) are multiple rings of said second diameter extending radially from said end fitting (20) and spaced along said end fitting (20).

6. An assembly as set forth in claim 5 wherein said rings are equally spaced along said end fitting (20).

7. An assembly as set forth in claim 5 wherein said vibration dampening means (16) includes a cylindrical tube including an inner surface with grooves (28) therein, said grooves (28) aligned with and in interlocking engagement with said rings (24) of said end fitting (20).

8. An assembly as set forth in claim 7 wherein said cylindrical tube of said vibration dampening means (16) includes an outer surface, said cylindrical outer surface of said vibration dampening means (16) including said retentive tabs (30) extending radially outwardly from said outer surface thereof.

9. An assembly as set forth in claim 8 wherein said retentive tabs (30) includes three rows of four equally circumferentially spaced tabs.

10. An assembly as set forth in claim 9 wherein said support means (14) includes a cylindrical wall (32) disposed about said cylindrical tube of said vibration dampening means (16), said cylindrical wall (32) of said support means (14) including said openings (34) extending radially outwardly through said support means (14) and aligned with said tabs (30) on said vibration dampening means (16) for mechanical interlocking engagement with said vibration dampening means (16) within said support means (14) to prevent disassembly of said vibration dampening means (16) from said support means (14) and for maintaining said vibration dampening means (16) free of radial compressive forces.

11. An assembly as set forth in claim 10 wherein said openings (34) are each defined by an oval wall, each of said tabs (30) being oval and filling one of said oval openings (34).

12. An assembly as set forth in claim 11 wherein said tabs (30) and contiguous openings (34) are circumferentially spaced and in longitudianlly spaced rows along said vibration dampening means (16).

13. An assemby as set forth in claim 12 wherein said vibration dampening means (16) extends longitudinally along said end fitting (20) to completely isolate said support means (14) by said vibration dampening means (16) and wherein said end fitting (20) extends along said conduit (18) further than said vibration dampening means (16) extends along said end fitting (20).

14. An assembly as set forth in claim 13 wherein said cylindrical section of said fitting (20) includes said first end (22) extending over the end face of said conduit (18) and having a hole (26) threthrough said core element (12) extending through said hole (26).

15. An assembly as set forth in claim 10 wherein said guide means includes a flexible conduit (18) having an end portion and said end fitting (20), said end fitting (20) being disposed about said end portion of said conduit (18) with said conduit (18) extending through said end fitting (20) from said first end (22) of said end fitting (20), said end fitting (20) and said end portion of said conduit (18) adjacent said first end (22) of said end fitting (20) being disposed within said vibration dampening means (16), said vibration dampening means (16) including a spacer (36) disposed about said first end (22) of said end fitting (20) and about said core element (12), said support means (14) including an outer cylindrical wall (32) and a swivel socket section (38) suspended in spaced relationship radially within said outer cylindrical wall (32) to expose said vibration dampening means (16) at both ends of said cylindrical wall (32), said spacer (36) of said vibration dampening means (16) being retained in said swivel socket section (38) for encapsulating the spherical end of a swivel tube (40) therein.

16. An assembly as set forth in claim 15 including a swivel tube (40) extending away from said first end (22) of said end fitting (20) and out of said swivel socket (38), said swivel tube (40) having a spherical end slidingly retained between said swivel socket section (38) and said spacer (36).

17. An assembly as set forth in claim 16 including spokes (44) suspending said swivel socket section (38) within said cylindrical wall (32) of said support means (14).

18. An assembly as set forth in claim 17 wherein said core element (12) includes a slider rod (46) slideably supported in and extending from said swivel tube (40).

* * * * *